(12) United States Patent
Xu et al.

(10) Patent No.: US 11,545,864 B2
(45) Date of Patent: Jan. 3, 2023

(54) ELECTRIC MOTOR AND COMPRESSOR (71) Applicant: GUANGDONG MEIZHI COMPRESSOR CO., LTD., Guangdong (CN)

(72) Inventors: Fei Xu, Guangdong (CN); Zhengzhong Qiao, Guangdong (CN); Xiaohua Qiu, Guangdong (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 380 days.

(21) Appl. No.: 16/741,878

(22) Filed: Jan. 14, 2020

(65) Prior Publication Data
US 2020/0153304 A1 May 14, 2020

Related U.S. Application Data (63) Continuation of application No. PCT/CN2018/088650, filed on May 28, 2018.

(30) Foreign Application Priority Data

Aug. 31, 2017 (CN) .......................... 201710778317.1
Aug. 31, 2017 (CN) ........................... 201721112311.2

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 1/2706* (2013.01); *H02K 15/0068* (2013.01); *H02K 2213/03* (2013.01)

(58) Field of Classification Search
CPC .. H02K 15/0062; H02K 15/0068; H02K 1/16; H02K 1/2706; H02K 2203/06; H02K 2213/03; H02K 3/28; H02K 3/522
See application file for complete search history.

(56) References Cited

U.S. PATENT DOCUMENTS

| 6,141,864 A | 11/2000 | Bugosh | |
| 2002/0051715 A1* | 5/2002 | Matsumoto | H02K 5/24 |
| | | | 417/410.3 |

(Continued)

FOREIGN PATENT DOCUMENTS

| CN | 103795304 B | 11/2015 |
| CN | 206211741 U | 5/2017 |

(Continued)

OTHER PUBLICATIONS

International Search Report dated Aug. 9, 2018 issued in PCT/CN2018/088650.

(Continued)

*Primary Examiner* — Minh N Trinh
(74) *Attorney, Agent, or Firm* — Scully Scott Murphy & Presser (57) ABSTRACT

An electric motor including a motor rotor and a motor stator including a stator core including a plurality of stator teeth spaced along a circumferential direction of the stator core, a plurality of coil groups, wherein each of the plurality of coil groups includes a plurality of coils wound on a corresponding stator tooth, and an incoming line terminal and an outgoing terminal both comprising a same number of coil ends, and two motor lead groups, wherein a number of the plurality of motor leads of each of the two motor lead groups is equal to a number of the plurality of coil groups, and wherein each of the plurality of motor leads is connected to (Continued)

one incoming line terminal or one outgoing line terminal of one corresponding coil group of the plurality of coil groups.

11 Claims, 7 Drawing Sheets

(51) Int. Cl.
   *H02K 1/2706* (2022.01)
   *H02K 15/00* (2006.01)

(56) References Cited

U.S. PATENT DOCUMENTS

| | | | |
|---|---|---|---|
| 2006/0123621 | A1 | 6/2006 | Akita et al. |
| 2017/0057373 | A1 | 3/2017 | Hao et al. |
| 2020/0153304 | A1* | 5/2020 | Xu .......................... H02K 3/28 |

FOREIGN PATENT DOCUMENTS

| | | | |
|---|---|---|---|
| CN | 107017709 A | 8/2017 | |
| CN | 107465279 A | 12/2017 | |
| JP | 2006-246674 A | 9/2006 | |

OTHER PUBLICATIONS

Supplementary European Search Report dated Jul. 2, 2020 received in European Patent Application No. EP 18850551.5.
Examination Report dated Jul. 14, 2020 received in Indian Patent Application No. IN 201927049816.

* cited by examiner

ELECTRIC MOTOR AND COMPRESSOR

TECHNICAL FIELD

The present disclosure relates to the technical field of compressor, in particular to an electric motor and a compressor.

BACKGROUND

As the excitation magnetic field of the permanent magnet electric motor of rotary DC inverter compressor is non-adjustable, the speed of the motor can only be adjusted within a small range of 30 rps to 90 rps. If the speed is forced up, the motor would enter a weak magnetic zone, which causes a rapid rise in coil current and a significant increase in temperature. As such the electric motor lines are degraded, and the reliability and performance of the electric motor are negatively affected.

In order to avoid the above problems, an exemplary method is to inject a negative direct axis current to the coil group of the motor to demagnetize the permanent magnet. Therefore, the back electromotive force is reduced, and the operating range of the electric motor is enlarged. However, the above method would result in a lower efficiency of the motor, when the motor is running at a high frequency.

SUMMARY

The main objective of the present disclosure is to provide an electric motor with a high working efficiency.

In order to achieve the above objective, the present disclosure provides an electric motor including an motor stator and an motor rotor, the motor stator includes:

a stator core having a plurality of stator tooth spaced along a circumferential direction of the stator core, two adjacent stator tooth defining a stator slot;

a plurality of coil groups, each of the plurality of coil groups including a plurality of coils wound on the stator tooth, and an incoming line terminal and an outgoing line terminal both composed of a same number of coil end; and two motor lead groups, each of the two motor lead groups including a plurality of motor leads connected with coil ends of the coil groups and an motor control circuit, a total number of the motor leads of each motor lead group being equal to a number of coil groups, and each motor lead being connected to one incoming line terminal or one outgoing line terminal of one corresponding coil group.

Optionally, the electric motor satisfies a relationship: $5.18 \times 10^{-7} \leq T \times Di^3 \times TPV^{-1} \leq 1.17 \times 10^{-6}$; T is a rated torque of the electric motor with a unit of N·m; Di is a minimum inner diameter of the stator core with a unit of mm; TPV is a torque per unit volume of the motor rotor with a unit of kN·m·m$^{-3}$, and TPV is greater than or equal to 5 kN·m·m$^3$, and less than or equal to 45 kN·m·m$^3$.

Optionally, the motor stator further includes a plurality of plug connectors, and the plurality of the motor leads of each motor lead group are connected with the motor control circuit through at least one plug connector.

Optionally, the number of the plug connectors is two, and the plurality of motor leads of each the motor lead group are connected with the motor control circuit by one plug connector.

Optionally, the number of plug connectors is corresponding to the number of the plurality of motor leads; and each of the plug connectors is connected to each corresponding motor lead.

Optionally, each of the coil groups include 2n coil ends, and n is a positive integer; and the 2n coil ends include n incoming line ends configured to form the incoming line terminal and n outgoing line ends configured to form the outgoing line terminal; one of the plug connectors is connected to one motor lead connected with the n incoming line ends, and the other one is connected to another electric motor lead connected with the n outgoing line ends.

Optionally, the number of coil groups is three, each coil group includes one incoming line end and one outgoing line end.

Optionally, the electric motor includes a first line connection state and a second line connection state, a back electromotive force coefficient of the electric motor is ke1, in response to the first line connection state; the back electromotive force coefficient of the electric motor is ke2, in response to the second line connection state; ke1 is greater than 45V/krpmm, and a result of dividing ke1 by ke2 is greater than or equal to 1.6 and lesser than or equal to 1.8.

Optionally, a rated rotating speed of the electric motor is greater than or equal to 6000 rpm.

Optionally, a maximum rotating speed of the electric motor is greater than or equal to 9000 rpm.

The present disclosure also provides a compressor including an electric motor as described above. The electric motor includes an motor stator and an motor rotor, the motor stator includes:

a stator core having a plurality of stator tooth spaced along a circumferential direction of the stator core, two adjacent stator tooth defining a stator slot;

a plurality of coil groups, each of the plurality of coil groups including a plurality of coils wound on the stator tooth, and an incoming line terminal and an outgoing line terminal both composed of a same number of coil end; and two motor lead groups, each of the two motor lead groups including a plurality of motor leads connected with coil ends of the coil groups and an motor control circuit, a total number of the motor leads of each motor lead group being equal to a number of coil groups, and each motor lead being connected to one incoming line terminal or one outgoing line terminal of one corresponding coil group.

In the present disclosure, each motor lead of two motor lead groups, which is connected with the motor control circuit and the plurality of coil groups, is electrically connected with one coil end of one coil group. So that the motor control circuit can be configured to switch line connecting modes of the coil groups of the electrical motor according to different operating conditions of the electric motor. Thus the working efficiency of the electric motor is improved.

BRIEF DESCRIPTION OF THE ACCOMPANYING DRAWINGS

In order to explain the embodiment of the present disclosure or the technical solution of the prior art more clearly, the following will briefly introduce the drawings supporting an understanding of the description of the embodiments disclosed in the subject application. The drawings show only some embodiments covered by the present disclosure. For those ordinary skill in the art, other drawings can be obtained according to the structure shown in these drawings without any creative effort.

DESCRIPTION OF REFERENCE NUMERALS

TABLE 1

| Reference Numeral | Name |
| --- | --- |
| 10 | Motor stator |
| 20 | Motor rotor |
| 30 | Housing |
| 31 | Accommodating cavity |
| 40 | Crankshaft |
| 50 | Cylinder |
| 51 | Compression cavity |
| 60 | Piston |
| 70 | Main bearing |
| 80 | Auxiliary bearing |
| 90 | Upper housing assembly |
| 101 | Stator core |
| 101a | Stator slot |
| 101b | Stator tooth |
| 102 | Coil |
| 102a | Incoming line end |
| 102b | Outgoing line end |
| 103 | Motor lead group |
| 103a | Motor lead |
| 104 | Plug connector |
| 104a | End |
| 901 | Wiring terminal |
| 902 | Binding post |

The implementation, functional characteristics and advantages of the present disclosure will be further described with reference to the attached drawings in combination with embodiments.

DETAILED DESCRIPTION OF ILLUSTRATIVE EMBODIMENTS

As following, embodiments of the present disclosure will be described clearly and completely with reference to the drawings of the present disclosure. Based on the embodiments described in the present disclosure, all other embodiments perceived by those ordinary skills in the art without creative effort will fall within the protection scope of the present disclosure.

It should be noted that all directional indicators (such as upper, lower, left, right, front, rear, etc.) in the embodiments disclosed in the present disclosure are only used to explain the relative positional relationship, movement, etc. between various components under a certain specific posture (as shown in the drawings). If the specific posture changes, the directional indicator will also change accordingly.

In addition, the descriptions, such as the "first" and the "second" in the present disclosure, can only be used for describing the aim of description, and cannot be understood as indicating or suggesting relative importance or impliedly indicating the number of the indicated technical character. Therefore, the character indicated by the "first" and the "second" can express or impliedly include at least one character. In addition, the technical proposal of each exemplary embodiment can be combined with each other, however the technical proposal must be based on what the person of ordinary skill in that art can realize from the technical proposal, when the combination of the technical proposals occurs contradiction or cannot be realized, it should consider that the combination of the technical proposals does not exist, and is not contained in the protection scope required by the present disclosure.

The present disclosure provides a compressor including an electric motor. The electric motor can be a permanent magnet electric motor, a three-phase asynchronous electric motor, etc., which is not limited in the present embodiment.

Figure 1:
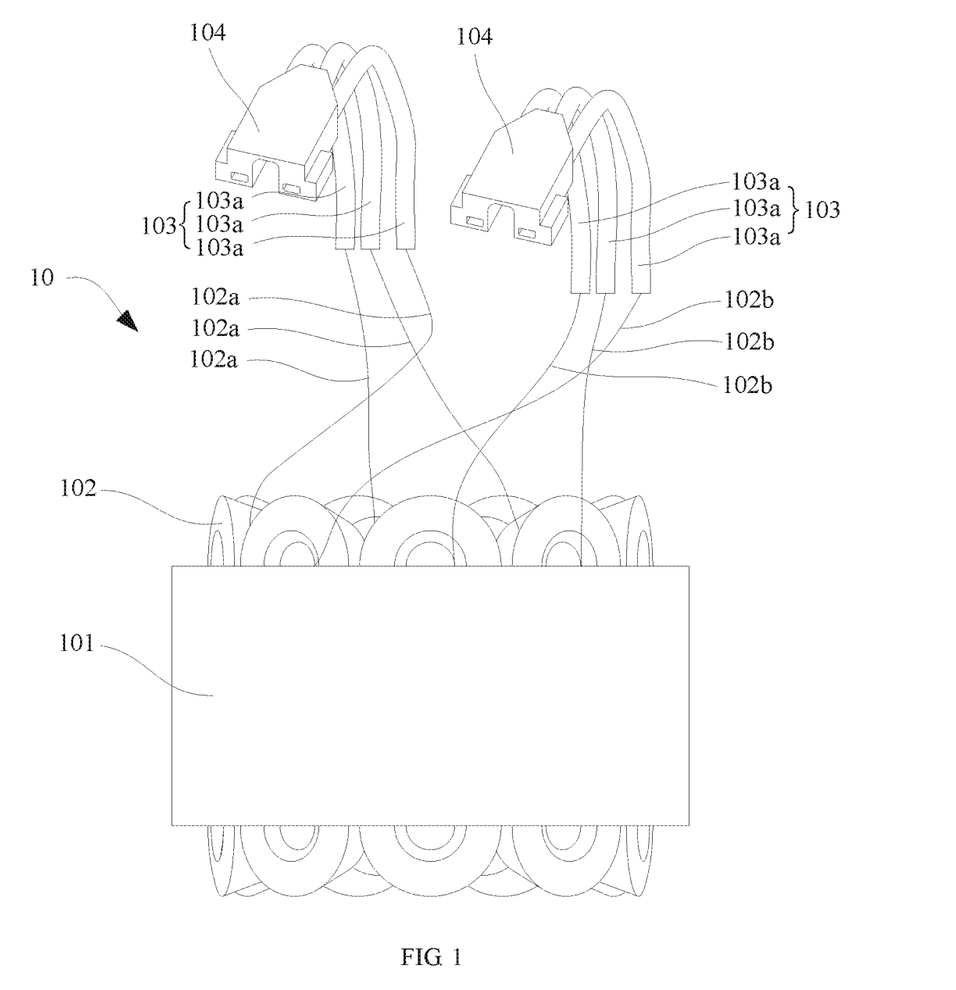
FIG. 1 is a schematic radial structural view of a motor stator according to an embodiment of the present disclosure.
Figure 2:
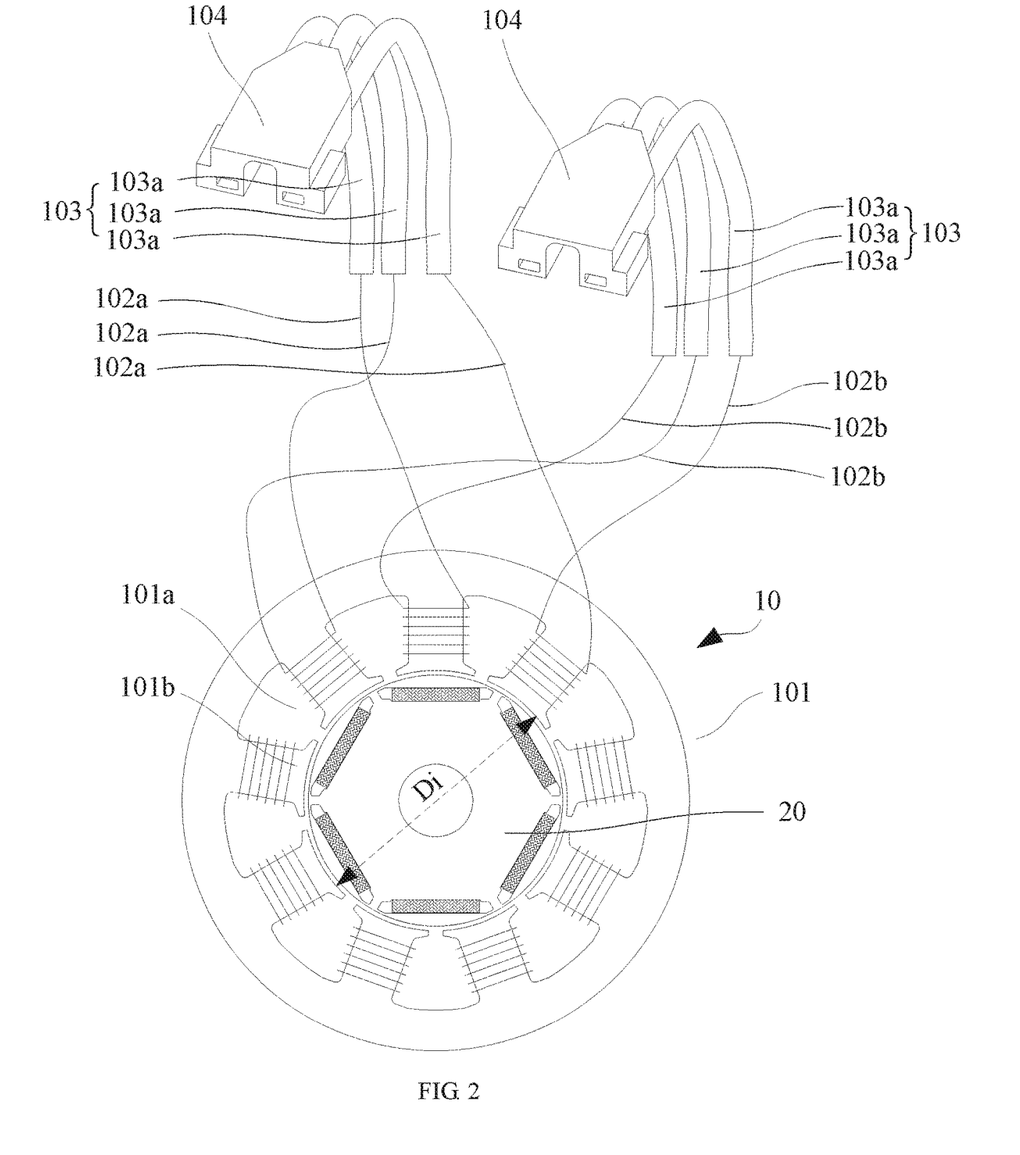
FIG. 2 is a schematic axial structural view of a motor stator according to an embodiment of the present disclosure.
Figure 3:
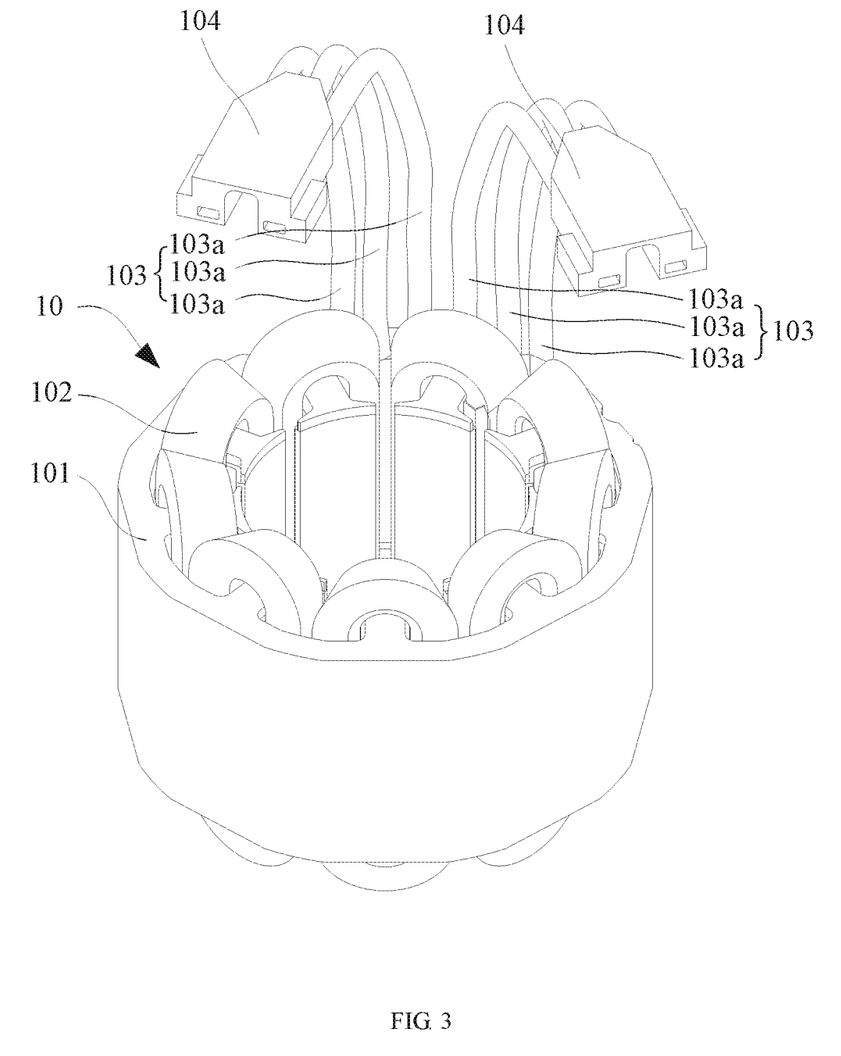
FIG. 3 is a schematic tridimensional structural view of a motor stator according to an embodiment of the present disclosure.

Referring to FIG. 1 to FIG. 3, the electric motor includes: a motor rotor 20; and a motor stator 10, where the motor rotor 20 includes: a stator core 101 including a plurality of stator tooth 101b spaced along a circumferential direction of the stator core 101, where two adjacent stator tooth 101b define a stator slot 101a; a plurality of coil groups, where each of the plurality of coil groups includes a plurality of coils 102 wound on the stator tooth 101b, and an incoming line terminal and an outgoing line terminal both including a same number of coil ends.

It is appreciated that each of the plurality of coil group includes a plurality of coils 102. When the plurality of coils 102 of one coil group are all connected in series, the one coil group includes two coil ends. At this time, one coil end thereof serves as the incoming line terminal of the one coil group, and the other coil end serves as the outgoing line terminal of the coil group. When the plurality of coils 102 of one coil group are not all connected in series, the number of coil ends of the coil group is an even number and greater than two. At this time, half of the coil ends serve as the incoming line terminal of the coil group, and the other half of the coil ends serve as the outgoing line terminal.

Referring to FIG. 1 to FIG. 3 again, the motor stator 10 further includes two motor lead groups 103. Each motor lead group 103 includes a plurality of motor leads 103a which are connect to a motor control circuit 105 (FIG. 5) and the coil ends of the plurality of coil groups. The total number of motor leads 103a in each motor lead group 103 is equal to the number of the plurality of coil groups. Each of the plurality of motor leads 103a is connected to one of the incoming line terminal or the outgoing line terminal of one of the plurality of coil groups.

It is appreciated that the total number of motor leads 103a in each motor lead group 103 is equal to the number of coil groups. Each motor lead 103a is connected to a line connecting terminal including one or more coil ends of one coil group. Thereby, the motor control circuit is configured to switch the line connecting modes of multiple coil groups according to the working condition of the electric motor. For example, the electric motor is configured to control the multiple coil groups to switch between a line connecting mode of connecting the incoming line terminals of the multiple coil groups together and another line connecting mode of connecting the incoming line terminal of each coil group with one corresponding outgoing line terminal of another coil group, according to different operating frequencies of the electric motor. So that the work efficiencies of the electric motor at high frequency and low frequency are balanced.

Figure 6:
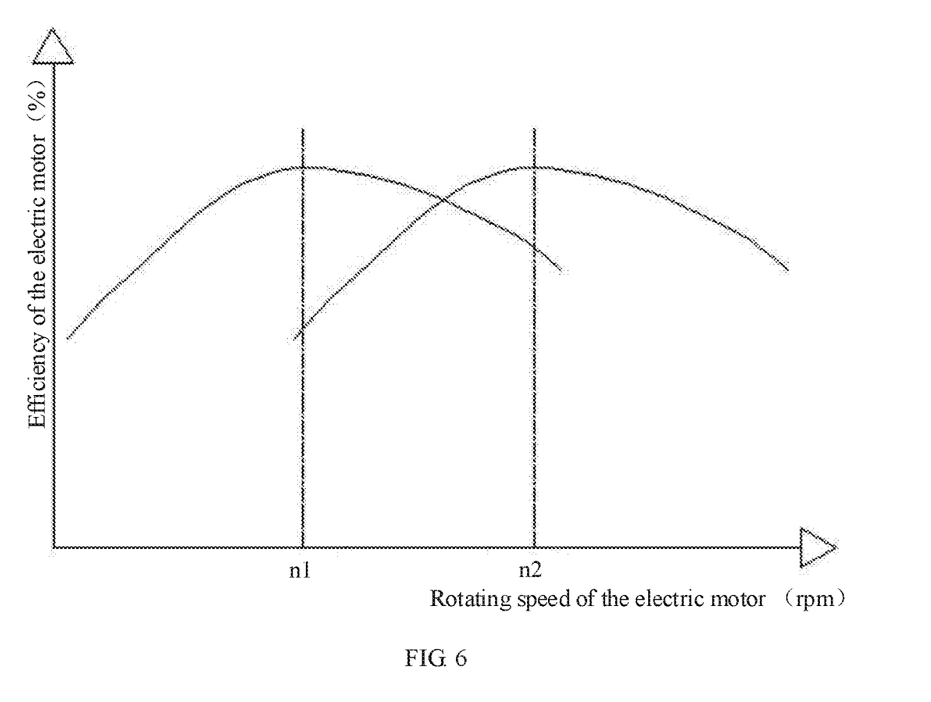
FIG. 6 is a schematic diagram of the relationships between the rotational speed and the efficiency of the electric motor at a high speed and a low speed according to the present disclosure.

As shown in FIG. 6, when the electric motor is running at a high speed, the electric motor has the highest efficiency at the rotating speed of n1. When the electric motor is running at a low speed, the electric motor has the highest efficiency at the rotating speed of n2.

In an embodiment, the electric motor has a first line connection state and a second line connection state by changing the line connecting mode. A back electromotive force coefficient of the electric motor is ke1, when the electric motor is in the first line connection state, and the back electromotive force coefficient of the electric motor is ke2, when the electric motor is in the second line connection state, where ke1 is greater than ke2. Therefore, the electric motor is made to be in the first line connection state when the electric motor is in the low speed running state. And the electric motor is made to be in the second line connection state when the electric motor is in the high speed running state. Accordingly, the electric motor is prevented from entering the weak magnetic zone, the required winding current is reduced when the electric motor generates the same torque, and copper consumption is reduced. Thus the electric motor has higher efficiency.

ke1 can be greater than or equal to 45 V/krpm, so that the electric motor has higher efficiency when operating at the low speed.

Further, a result of dividing ke1 by ke2 is equal to or greater than 1.6, and equal to or less than 1.8, which balances the working efficiencies of the electric motor at the high speed and the low speed and improves the overall performance of the electric motor. The specific values of ke1 and ke2 are determined according to the type of the electric motor. For example, the back electromotive force coefficient ke1 is 84.33 V/krpm when the electric motor is in the first line connection state, and the back electromotive force coefficient ke1 is 48.89 V/krpm when the electric motor is in the second line connection state, so that the electric motor which has high working efficiency at both the high speed and the low speed, and the high speed and the low speed are matched with the compressor.

It is appreciated that there are various kinds of line connecting modes, which are determined according to the type of the electric motor. For example, when the electric motor is in the first line connection state, the lead tail ends of the plurality of windings of the electric motor are electrically connected to each other, or the head ends of the plurality of windings of the electric motor are electrically connected to each other, such that the back electromotive force coefficient of the electric motor is ke1. When the electric motor is in the second line connection state, the lead head ends of the plurality of windings of the electric motor can be electrically connected to each other in an end-to-end manner, and the back electromotive force coefficient of the electric motor is ke2.

In addition, the electric motor is enabled to run more stably and efficiently by changing the electric motor control parameters. For example, the electric motor can have two sets of electric motor control parameters. When the line connecting mode of the electric motor is changed, the electric motor is controlled by different electric motor control parameters to ensure stable and efficient operation of the electric motor. For example, when the line connection mode of the electric motor is changed to increase the back electromotive force coefficient of the electric motor, one or more parameters of the line resistance Ω, the peak-to-peak value of the magnetic flux (mWb.T), and the cross-axis inductance Ld/Lq(mH) of the electric motor can be increased to ensure stable and efficient operation of the electric motor. Other parameters of the electric motor can also be controlled to change, and is not limited in the present embodiment.

In one embodiment, when the electric motor is in the first line connection state and the back electromotive force coefficient ke1 is 84.33 V/k rpm, at this time the line resistance Ω is 7.42Ω, and the peak-to-peak value of the magnetic flux (mWb.T) is 75.4 mWb.T, and the cross-axis inductance Ld/Lq (mH) is 27.37 mH/41.23 mH. When the electric motor is in the second line connection state and the back electromotive force coefficient ke2 is 48.89 V/krpm, at this time the line resistance Ω is 2.48Ω, the peak-to-peak value of the magnetic flux (mWb.T) is 43.9 mWb.T, and the cross-axis inductance Ld/Lq(mH) is 10.03 mH/13.53 mH. Accordingly, the electric motor can operate stably and efficiently under both line connection states.

On this basis, the electric motor can also have a third line connection state, a fourth line connection state, etc., so that the electric motor has additional back electromotive force coefficients. Correspondingly, the electric motor also has more sets of electric motor control parameters which correspond to different line connection states.

In one embodiment, the electric motor can be switched between different line connection states by program control mode or circuit control mode. In one embodiment, the electric motor includes an electrical control board that is electrically connected to the leads of the electric motor, to control the electric motor to switch between different line connection states.

In one embodiment, in order to better fit the electric motor and the compressor, the electric motor satisfies a relationship:

$$5.18 \times 10^{-7} \leq T \times Di^{-3} \times TPV^{-1} \leq 1.17 \times 10^{-6}, \text{ in which:}$$

T is a rated torque of the electric motor with a unit of N·m,

Di is a minimum inner diameter of the stator core 101 with a unit of mm, that is, as shown in FIG. 2, the diameter of a circle is formed by enclosing ends of the plurality of stator tooth 101b of the stator core 101 facing the centre line, and TPV is a torque per unit volume of the motor rotor 20 with a unit of kN·m·m$^{-3}$, and TPV is greater than or equal to 5 kN·m·m$^3$, and less than or equal to 45 kN·m·m$^{-3}$.

The above electric motor can also be used in other fields depending on the type and size of the electric motor.

In order to connect the motor lead 103a in each motor lead group 103 to the motor control circuit quickly and conveniently, in one embodiment, the motor stator 10 further includes a plurality of plug connectors. The plurality of the motor leads 103a of each motor lead group 103 are connected with a motor control circuit through at least one plug connector.

Figure 4:
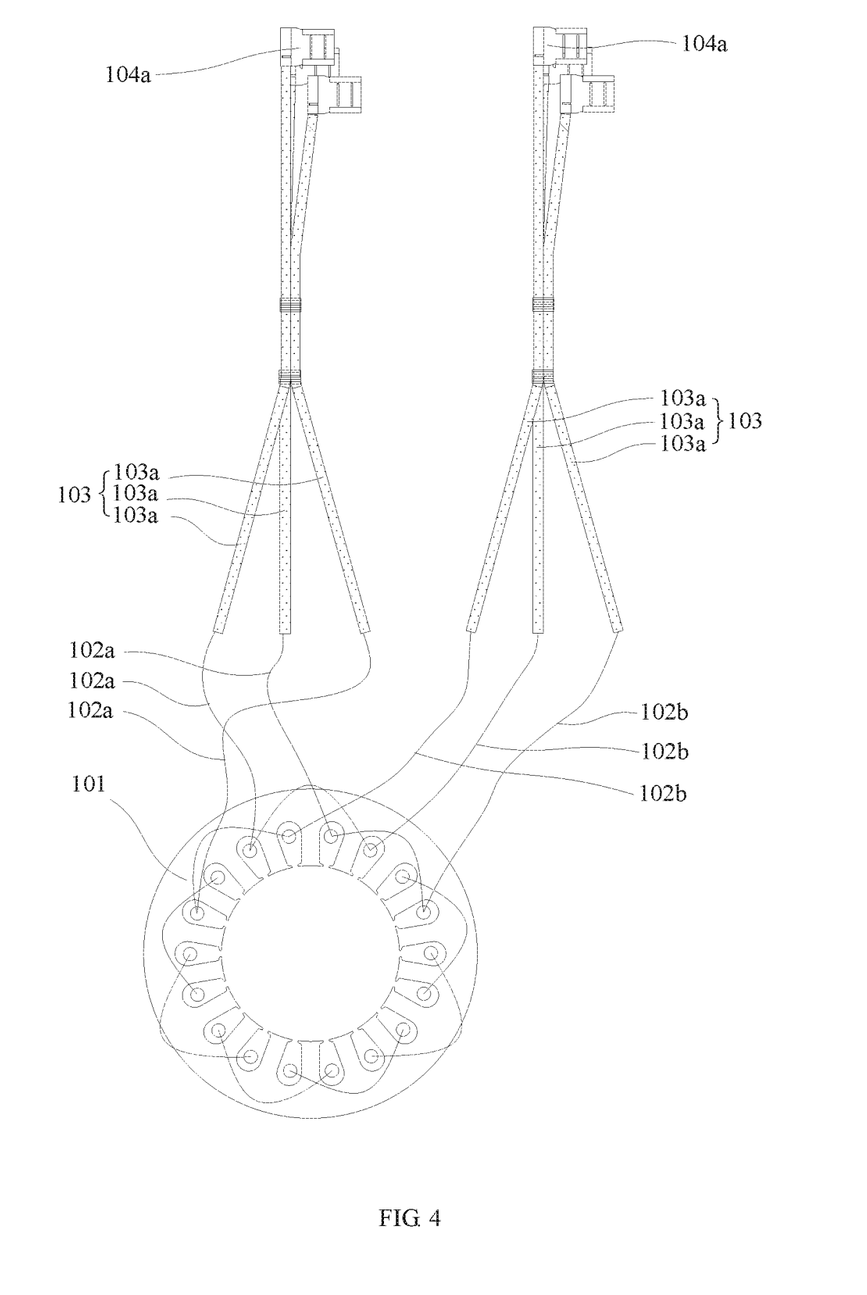
FIG. 4 is a schematic structural view of a motor stator according to another embodiment of the present disclosure.

The plug connector can adopt the structure of the plug connector 104 as shown in FIG. 1 to FIG. 3, or the structure of the plug connector 104a as shown in FIG. 4. The plug connector 104 shown in FIG. 1 to FIG. 3 has a junction box structure. The plug connector 104 can be suitable for connecting with a plurality of motor leads 103a. The plug connector 104a shown in FIG. 4 has a conductive insert structure. The plug connector 104a can be suitable for connecting with one motor lead 103a. The plug connector can also have other structures, which are not limited in the present embodiment.

In an embodiment, as shown in FIG. 1 to FIG. 3, the number of the plug connectors 104 is two. The plurality of motor leads 103a of each the motor lead groups 103 are connected with the motor control circuit by one plug connector 104, for increasing the connection efficiency of the two motor lead groups 103 and the motor control circuit.

In an embodiment, each of the coil groups includes 2n coil ends, and n is a positive integer, and the 2n coil ends include n incoming line ends 102a configured to form the incoming line terminal and n outgoing line ends 102b configured to form the outgoing line terminal; one of the two ends 104 is connected to one motor lead 103a connected with the n incoming line ends, and the other one is connected to one motor lead 103a connected with the n outgoing line ends 102b, for connecting the coil group end and the motor control circuit more conveniently.

In an embodiment, the number of coil groups in the electric motor depends on the type of the electric motor. For example, the number of coil groups is three, and that multiple coils in each coil group are connected in series. Each coil group has one incoming line end 102a and one outgoing line end 102b. Thus the structure of the coil group is simplified, and the control effect of the motor control circuit on the electric motor is improved.

In an embodiment, as shown in FIG. 4, the number of plug connectors 104a corresponds to the number of the plurality of motor leads 103a, and each of the plug connectors 104a is connected to each corresponding motor lead 103a. Thereby the connection of each motor lead group 103 to the motor control circuit is more flexible.

In an embodiment, the number of plug connectors is equal to or greater than two, and less than or equal to the total number of motor leads 103a, of which the details will not be described herein.

In an embodiment, when a rated rotating speed of the electric motor is greater than or equal to 6000 rpm, or when a maximum rotating speed of the electric motor is greater than or equal to 9000 rpm, the electric motor has a higher efficiency by adopting the connection mode of connecting each motor lead 103a in the two motor lead groups 103 to one coil end of one coil group.

Figure 7:
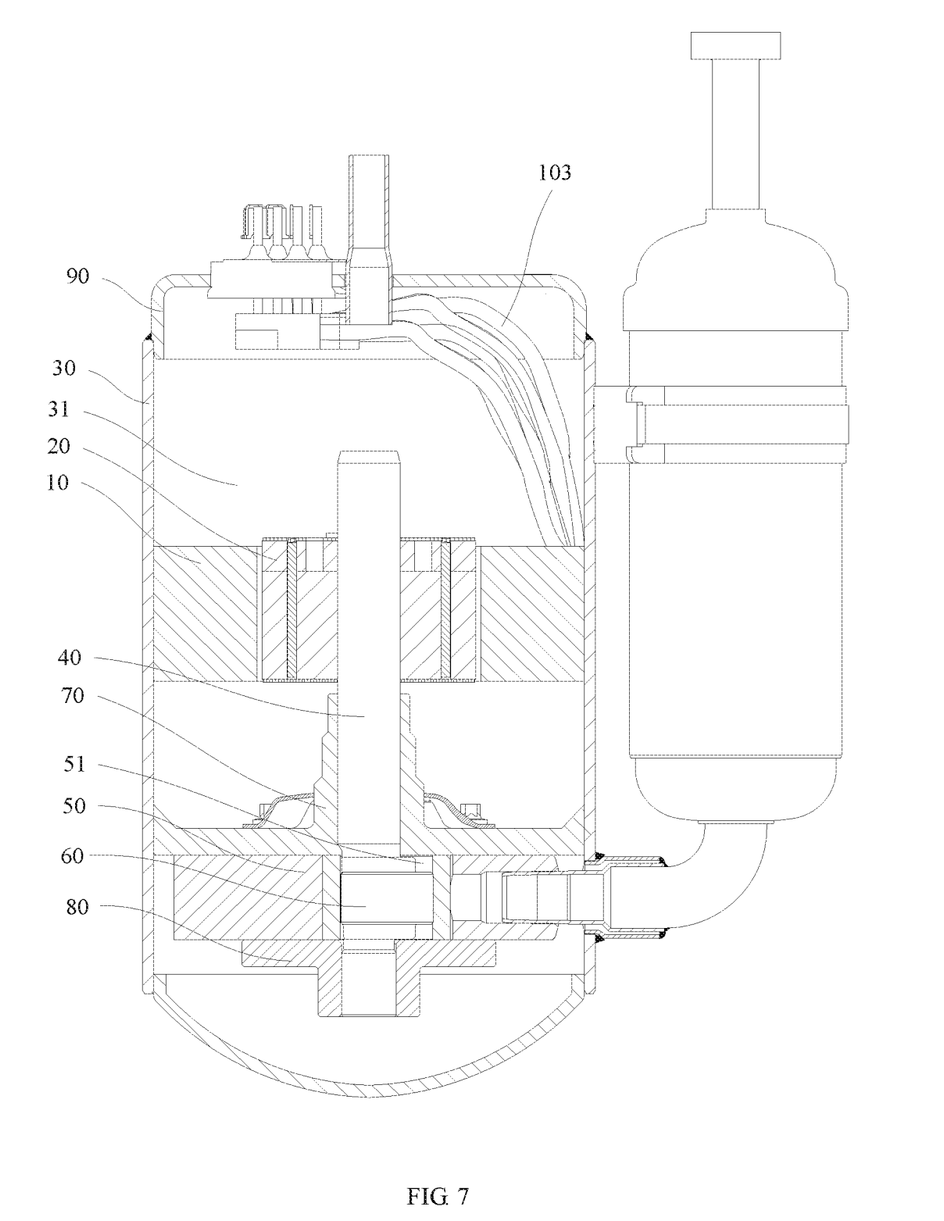
FIG. 7 is a schematic structural view of the compressor according to an embodiment of the present disclosure.

In an embodiment, as shown in FIG. 7, the compressor includes a housing 30, a crankshaft 40, a cylinder 50, a piston 60, a main bearing 70, an auxiliary bearing 80, and an electric motor as described above.

The housing 30 has a cylindrical shape, and defines an accommodating cavity 31 extending in the axial direction thereof. The crankshaft 40 is disposed in the accommodating cavity 31 and disposed along an axial direction of the housing 30. The lower end of the crankshaft 40 passes through the cylinder 50, and a portion of the crankshaft 40 that extends into the cylinder 50 forms an eccentric portion, and the piston 60 is sleeved on the eccentric portion. The main bearing 70 and the auxiliary bearing 80 are respectively sleeved on the upper end and lower end of the crankshaft 40, and are fixed to the upper end and lower end of the cylinder 50 to seal the compression cavity 51 of the cylinder 50. The electric motor is disposed in the accommodating cavity 31 of the housing 30, and the rotor core 20 of the electric motor is connected to the upper end of the crankshaft 40.

Figure 5:
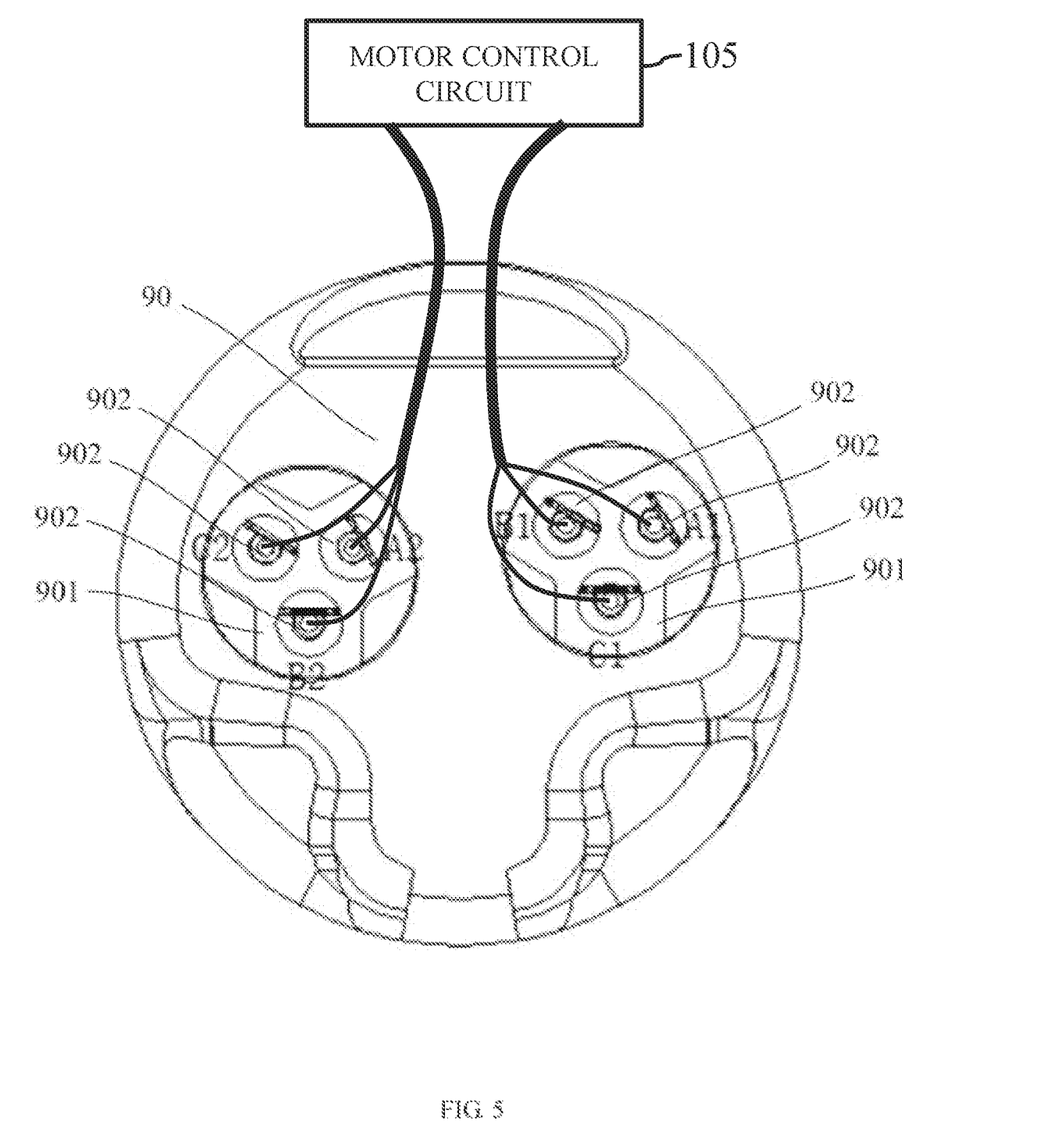
FIG. 5 is a schematic structural view of an upper housing assembly of a compressor according to an embodiment of the present disclosure.

In an embodiment, a wiring terminal connected to the control circuit of the electric motor is disposed at the inner wall of the accommodating cavity 31 of the compressor, the wiring terminal is inserted into the correspondingly plug connector of the electric motor. Thereby the motor lead 103a and the motor control circuit are electrically connected. Specifically, as shown in FIG. 5 and FIG. 7, the top of the compressor has an upper housing assembly 90, and one side of the upper housing assembly 90 facing the accommodating cavity 31 has a plurality of wiring terminals 901, and the wiring terminals 901 are inserted into correspondingly plug connectors of the electric motor. Thus the motor lead 103a and the motor control circuit are electrically connected.

In an embodiment, the wiring terminal 901 includes a plurality of binding posts 902, which are plugged into the plug connector. The number of the binding posts depends on the number of coil ends of the plurality of coil groups of the electric motor. Since the number of windings of the electric motor generally does not exceed three, each coil group has one incoming line terminal and one outgoing line terminal. Therefore, at least six binding posts 902 are disposed on the compressor to enable the compressor to be fitted with more models of electric motors.

It should be noted that the present disclosure is based on the fact that the total number of motor leads 103a in the two motor lead groups 103 is equal to twice the number of all coil groups. Each motor lead 103a is connected to a line connecting terminal including one or more coil ends of one coil group, to control the control circuit to conveniently switch the line connecting mode of the plurality of coil groups in the electric motor according to the working condition of the electric motor. On the basis of the above, the electrical connection mode of the plurality of motor leads 103a and the control circuit is not limited in the above embodiments. Other structures similar to the plug connector can be adopted to improve the connection efficiency of the motor leads 103a and the motor control circuit. The structure of the plug connector can be slightly changed, and the present disclosure does not limit the structure of the plug connector.

It is appreciated that since the compressor proposed in the present disclosure includes all the solutions of all the embodiments of the above-mentioned electric motor. Thus, the compressor at least has the same technical effects as the electric motor. As such the details of the technical effects of the compressor will not be explained here.

The foregoing description merely depicts some preferred embodiments of the present application and therefore is not intended to limit the scope of the application. An equivalent structural or flow changes made by using the content of the specification and drawings of the present application, or any direct or indirect applications of the disclosure on any other related fields shall all fall in the scope of the application.

What is claimed is:
1. An electric motor comprising:
   a motor rotor; and
   a motor stator comprising:
      a stator core comprising a plurality of stator teeth spaced along a circumferential direction of the stator core, wherein any adjacent two stator teeth of the plurality of stator teeth define a stator slot;
      a plurality of coil groups, wherein each of the plurality of coil groups comprises:
         a plurality of coils wound on a corresponding stator tooth of the plurality of stator teeth; and
         an incoming line terminal and an outgoing line terminal both comprising a same number of coil ends; and
      an incoming motor lead group and an outgoing motor lead group,
         wherein the incoming motor lead group comprises a first plurality of motor leads that connect the coil ends of the incoming line terminals of the plurality of coil groups to a motor control circuit;
         wherein the outgoing motor lead group comprises a second plurality of motor leads that connect the coil ends of the outgoing line terminals of the plurality of coil groups to the motor control circuit separately from the first plurality of motor leads,
wherein the first plurality of motor leads and the second plurality of motor leads each comprise a number of motor leads equal to a number of the plurality of coil groups,
wherein the motor control circuit is configured to operate the electric motor based on relationship such that $T \times Di^{-3} \times TPV^{-1}$ is greater than or equal to $5.18 \times 10^{-7}$, and $T \times Di^{-3} \times TPV^{-1}$ is less than or equal to $1.17 \times 10^{-6}$,
wherein the electric motor has a rate of torque (T) in a unit of Nm,
wherein the stator core has a minimum diameter (Di) in a unit of mm, and
wherein the motor control circuit is configured to operate the motor rotor with a torque per unit volume (TPV) that is greater than or equal to 5 kN·m·m$^{-3}$ and less than or equal to 45 kN·m·m$^{-3}$.

2. The electric motor according to claim 1,
wherein the motor stator further comprises:
a plurality of plug connectors,
wherein the first plurality of motor leads and the second plurality of the motor leads are each configured to connect with the motor control circuit via at least one corresponding plug connector of the plurality of plug connectors.

3. The electric motor according to claim 2,
wherein a number of the plurality of plug connectors is the same as a number of each of the first plurality of motor leads and the second plurality of motor leads, and
wherein each of the plurality of plug connectors is connected to a corresponding motor lead of one of the first plurality of motor leads and the second plurality of motor leads.

4. The electric motor according to claim 2,
wherein a number of the plurality of plug connectors is two, and
wherein the first plurality of motor leads and the second plurality of motor leads are each configured to separately connect with the motor control circuit via one corresponding plug connector of the two plug connectors.

5. The electric motor according to claim 4,
wherein each of the coil groups comprises 2n coil ends, and n is a positive integer,
wherein the 2n coil ends comprise n incoming line ends configured to form the incoming line terminal or the incoming line terminals and n outgoing line ends configured to form the outgoing line terminal or the outgoing line terminals, and
wherein one plug connector of the two plug connectors is connected to one motor lead of the first plurality of motor leads connected with the n incoming line ends, and the other plug connector of the two plug connectors is connected to another motor lead of the second plurality of motor leads connected with the n outgoing line ends.

6. The electric motor according to claim 5,
wherein a number of the plurality of coil groups is three, and
wherein each coil group of the plurality of coil groups comprises one incoming line terminal and one outgoing line terminal.

7. The electric motor according to claim 1,
wherein the motor control circuit is configured to operate the electric motor at a rated rotating speed that is equal to or greater than 6000 rpm.

8. The electric motor according to claim 1,
wherein the motor control circuit is configured to operate the electric motor at a maximum rotating speed that is greater than or equal to 9000 rpm.

9. The electric motor according to claim 1, wherein:
the electric motor is configured to operate in a first line connection state in which one of:
the coil ends of the incoming line terminals of the plurality of coil groups are connected together by the motor control circuit; and
the coil ends of the outgoing line terminals of the plurality of coil groups are connected together by the motor control circuit; and
the electric motor is configured to operate in a second line connection state in which the coil ends of the incoming line terminals of the plurality of coil groups are connected together in an end-to-end manner by the motor control circuit.

10. The electric motor according to claim 9,
wherein the electric motor is configured to have a back electromotive force coefficient of ke1 when in the first line connection state,
wherein the electric motor is configured to have a back electromotive force coefficient of ke2 when in the second line connection state, and
wherein ke1 is equal to or greater than 45V/krpmm, and a result of dividing ke1 by ke2 is equal to or greater than 1.6, and equal to or less than 1.8.

11. A compressor comprising:
the electric motor comprising:
a motor rotor; and
a motor stator comprising:
a stator core comprising a plurality of stator teeth spaced along a circumferential direction of the stator core, wherein any adjacent two stator teeth of the plurality of stator teeth define a stator slot;
a plurality of coil groups, wherein each of the plurality of coil groups comprises:
a plurality of coils wound on a corresponding stator tooth of the plurality of stator teeth; and
an incoming line terminal and an outgoing line terminal both comprising a same number of coil ends; and
an incoming motor lead group and an outgoing motor lead group,
wherein the incoming motor lead group comprises a first plurality of motor leads that connect the coil ends of the incoming line terminals of the plurality of coil groups to a motor control circuit;
wherein the outgoing motor lead group comprises a second plurality of motor leads that connect the coil ends of the outgoing line terminals of the plurality of coil groups to the motor control circuit separately from the first plurality of motor leads,
wherein the first plurality of motor leads and the second plurality of motor leads each comprise a number of motor leads equal to a number of the plurality of coil groups; and
wherein the motor control circuit is configured to operate the electric motor based on relationship such that $T \times Di^{-3} \times TPV^{-1}$ is greater than or equal to $5.18 \times 10^{-7}$, and $T \times Di^{-3} \times TPV^{-1}$ is less than or equal to $1.17 \times 10^{-6}$,
wherein the electric motor has a rate of torque (T) in a unit of Nm,
wherein the stator core has a minimum diameter (Di) in a unit of mm, and wherein the motor control circuit is configured to operate the motor rotor with a torque per unit volume (TPV) that is greater than or equal to 5 kN·m·m$^{-3}$ and less than or equal to 45 kN·m·m$^{-3}$, and at least six binding posts configured to be connected to the plurality of motor leads.

* * * * *